United States Patent
Lee (10) Patent No.: US 6,571,340 B1
(45) Date of Patent: May 27, 2003

(54) PORTABLE COMPUTER WITH POWER ADAPTER UNIT PROVIDED AND COOLING FAN EXTERNAL AND ADJACENT TO MAIN HOUSING

(75) Inventor: Kyung-Sup Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/444,202

(22) Filed: Nov. 22, 1999

(30) Foreign Application Priority Data

Dec. 1, 1998 (KR) .............................. 98-53002

(51) Int. Cl.[7] ................................. G06F 1/26
(52) U.S. Cl. ..................... 713/300; 700/300; 700/299
(58) Field of Search ................... 700/300, 299; 713/300

(56) References Cited

U.S. PATENT DOCUMENTS 5,463,742 A * 10/1995 Kobayashi .................. 395/281
5,664,118 A * 9/1997 Nishigaki et al. ........... 395/283
5,898,569 A * 4/1999 Bhatia ......................... 361/700
6,034,871 A * 3/2000 Cheng ......................... 361/695
6,081,425 A * 6/2000 Cheng ......................... 361/704

* cited by examiner

Primary Examiner—Dennis M. Butler
Assistant Examiner—N C Patel
(74) Attorney, Agent, or Firm—Robert E. Bushnell, Esq.

(57) ABSTRACT

The present invention relates to a portable computer having a power adapter unit and a detachable cooling fan. There is provided an adapter unit converting AC voltage into DC voltage and supplying the DC voltage to the portable computer, including an input terminal for receiving the AC voltage, a voltage-transformation member for converting the AC voltage into the DC voltage, an output terminal for supplying the DC voltage of the voltage-transformation member with the portable computer, and a ventilation member attached to the portable computer housing, wherein the ventilation member induces an airflow within the electronic circuit containing housing of the portable computer, and wherein the output terminal and the ventilation member are integrated to be electrically connected with the portable computer.

19 Claims, 10 Drawing Sheets

PORTABLE COMPUTER WITH POWER ADAPTER UNIT PROVIDED AND COOLING FAN EXTERNAL AND ADJACENT TO MAIN HOUSING

CLAIM OF PRIORITY

This application makes reference to, incorporates the same herein, and claims all benefits accruing under 35 U.S.C. §119 from an application for Portable Computer With Adapter Unit Provided With Outer Cooling Fan earlier filed in the Korean Industrial Property Office on Dec. 1, 1998 and there duly assigned Ser. No. 53002/1998.

BACKGROUND OF THE INVENTION

1. Field of the Invention

The present invention relates to a portable computer with a cooling device and, more particularly to a portable computer with a power adapter unit provided with a cooling fan external, but adjacent, to the main housing.

2. Description of the Related Art

Portable computers must be small, light, and sturdy yet have as large a data storage capacity as possible within the limits of these restrictions. The big obstacle to achieving this goal is the heat generated by the computer components. Various methods of cooling by ventilation have been attempted. A variable speed fan has been used, the speed of which varies with the temperature. It has also been proposed to provide air flow in a modular housing each containing modular electronic components by causing the fan to operate at a higher speed if the temperature in any of the modular compartments exceeds a threshold temperature.

As mentioned above, various cooling methods are proposed and attempted, but the restrictive space of the portable computer has a limitation of the capacity of cooling. And the process of assembling many cooling devices in a restricted narrow space causes a lower production efficiency. Furthermore, recently the increasing heat according to the increasing speed of the CPU exceeds the limit of the cooling capacity of the earlier cooling device using the internal cooling fan and heat sink.

U.S. Pat. No. 5,881,298 for a Portable Computer With Selectively Operable Cooling Unit to Cathey discloses a portable computer that has both a cooling unit and an external AC to DC converter to power said portable computer. The embodiments shown in FIGS. 1 and 2 show an active cooling unit, which may be a cooling fan, located inside portable computer. The embodiment shown in FIG. 4 of Cathy '298 show a cooling system external to the portable computer but the cooling system operates under the principles of using a liquid cooling fluid, such as Freon. In contradistinction, what is needed is a detachable unit for an electronic device such as a portable computer that 1) provides AC to DC power conversion, and 2) cools the interior of the computer hardware by forcibly drawing air through the hardware containing interior of the electrical device to keep the electronic components cool. This detachable unit connects to an opening found in the sidewall of the electronic device. The opening in the electronic device opens and closes depending on whether the detachable unit is connected to the electronic device. Adjacent to the opening is a DC power connector that supplies DC voltage to the electronic device when the detachable unit is connected to the opening in the electronic device so that the detachable device simultaneously 1) provides DC voltage to the electronic device, and 2) keeps the electrical hardware internal to the electronic device cool by forced convection of air by using a fan.

SUMMARY OF THE INVENTION

It is therefore an object of the present invention to provide a portable electronic device capable of drawing heated air remaining in the portable electronic device out of a main housing of the portable electronic device regardless of a size of the internal space of the portable electronic device.

It is another object to provide an adapter unit attached an electronic device and capable of drawing heated air in the electronic device out of the electronic device.

It is yet another object to provide an electronic device having a detachable cooling fan located external, but adjacent to the main housing of the electronic device to keep internal electrical components in the main housing of the electronic device from overheating.

It is still yet another object to provide a unit that attaches to the main housing of an electronic device to force an air current through the main housing of the housing of the electronic device while converting AC power into DC power for use by said electronic device.

In order to attain the above objects, according to an aspect of the present invention, there is provided an adapter unit converting AC voltage into DC voltage and supplying the DC voltage with an electronic device, including: an input terminal for receiving the AC voltage; a voltage-transformation member for converting the AC voltage into the DC voltage; an output terminal for supplying the DC voltage of the voltage-transformation member to the electronic device; and a ventilation member attached to the electronic device, wherein the ventilation member induces air-circulation inside the electronic device, and wherein the output terminal and the ventilation member are integrated and electrically connected with the electronic device.

In the adapter unit according to the invention, the ventilation member includes a housing having a surface and an internal space; at least one opening formed on the surface of the housing, wherein air enters through the at least one opening; and a fan provided for the housing, wherein the fan discharges air from an inside of electronic device to outside of the same through at least one opening when the output terminal is connected with the electronic device. Furthermore, in the adapter unit, the ventilation member further includes a switch capable of operating the fan.

According to another aspect of this invention, there is provided a portable electronic device operated by a battery or a power adapter, including: a housing incorporating a plurality of electronic units, wherein the housing has a opening formed on a surface of the housing and a connector disposed at an adjacent portion of the opening portion of the housing to be connected with the electronic units; and an adapter unit supplying power with the electronic units through the connector and drawing air within the housing through the opening.

In the portable electronic device according to the invention, the adapter unit includes an input terminal for receiving AC voltage; a voltage-transformation member for converting the AC voltage into DC voltage; a ventilation member connected with the voltage-transformation member through a cable and attached to the surface of the housing formed the opening to induce air-circulation inside the housing; and an output terminal integrated with the ventilation member and coupled to the connector to supply the DC voltage from the voltage-transformation member with the electronic circuit units.

Furthermore, in the portable electronic device, the ventilation member includes a ventilation housing having a surface and an internal space; a ventilation opening formed on the surface of the ventilation housing, wherein air within the housing is passed the opening of the housing and drawn into the ventilation housing through the ventilation opening; and a fan provided for the ventilation housing, wherein the fan draws and discharges air from the inside of the housing to the outside of the ventilation housing through the ventilation opening when the output terminal is connected with the connector.

Still furthermore in the portable electronic device, the housing further includes a opening door provided at an adjacent portion of the opening, wherein the opening is closed by the opening door when the ventilation member is separated from the surface of the housing provided with the opening whereas the opening is open by the movement of the opening door when the ventilation member is attached to the surface of the housing to induce air-circulation of the inside of the housing.

Still furthermore in the portable electronic device, the adapter unit includes an input terminal for receiving AC voltage; a main body having a surface and provided with a voltage-transformation member for converting the AC voltage into DC voltage. an output terminal provided at the surface of the main body and coupled to the connector to supply the DC voltage from the voltage-transformation member with the electronic units; a ventilation opening formed on the surface of the main body, wherein air within the housing is passed the opening of the housing and drawn into the main body through the ventilation opening; and a fan provided for the main body, wherein the fan draws and discharges air from the inside of the housing to the outside of the main body through the ventilation opening when the output terminal is connected with the connector.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
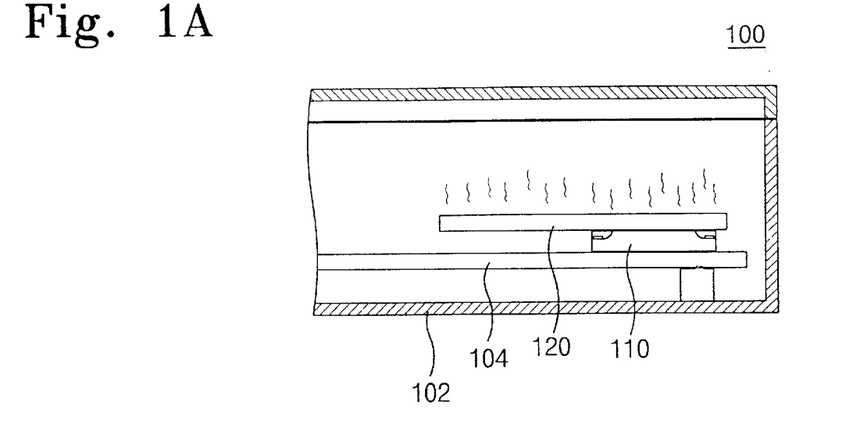
FIGS. 1a, 1b and 1c are diagrams for illustrating earlier structures for radiating heat.
Figure 1B:
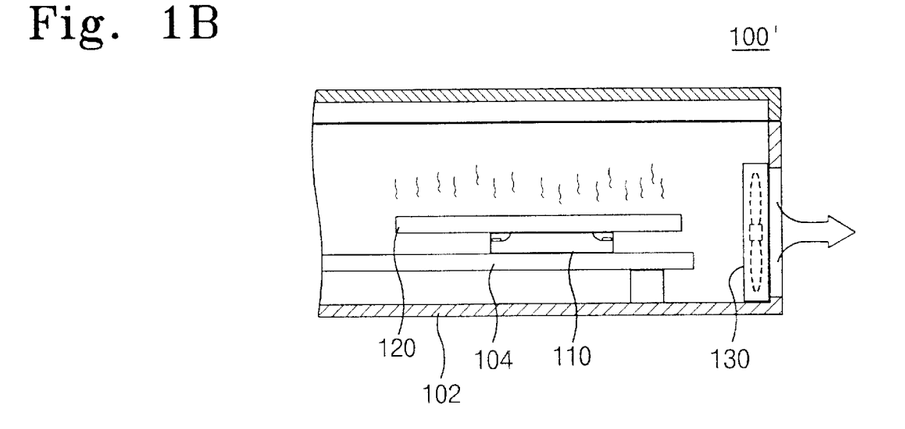
Figure 1C:
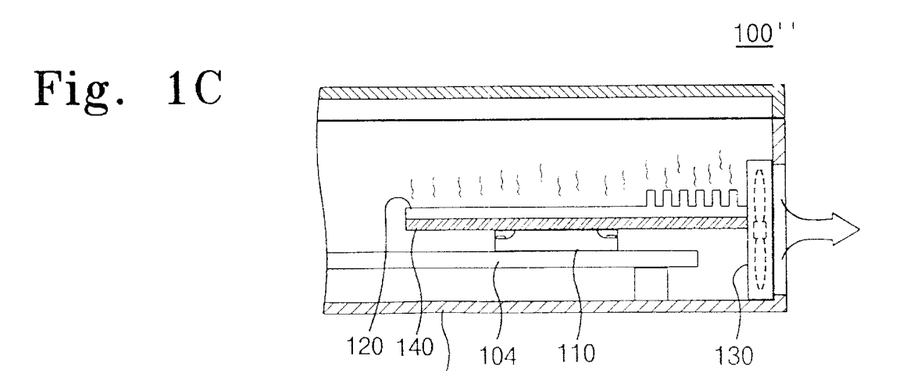
Figure 2:
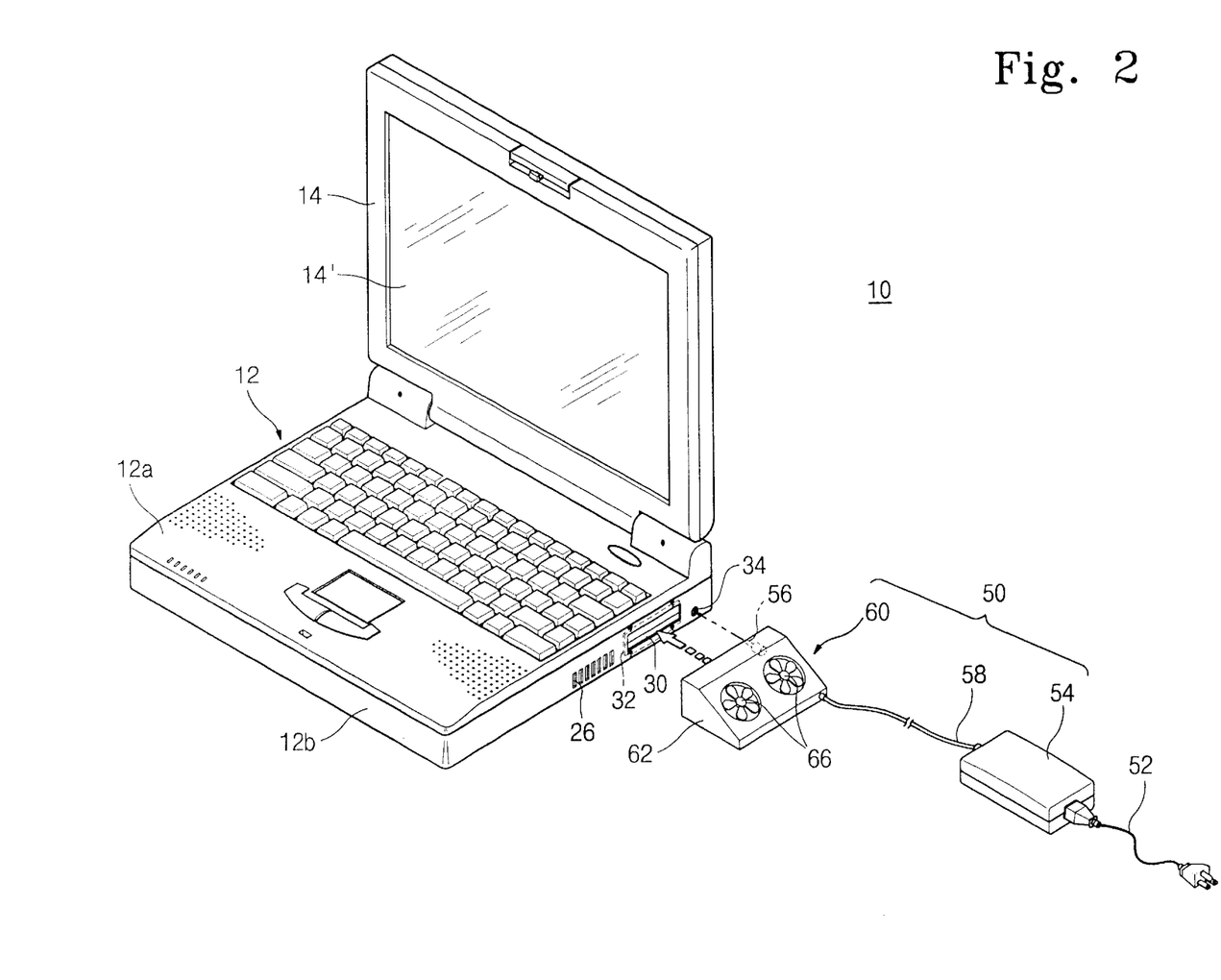
FIG. 2 is a perspective view for illustrating a portable computer according to the first embodiment of the present invention.

FIGS. 1a, 1b and 1c are diagrams for illustrating earlier structures for radiating heat. Referring to FIG. 1a, a printed circuit board 104 is disposed in a housing 102 of a portable computer 100. A CPU 110 is mounted on the printed circuit board 104 and a heat sink 120 is loaded on the CPU 110. The heat generated by the activation of the CPU 110 is conducted to the heat sink 120 and radiated to a internal space of the housing 102. Therefore, a heat radiated from the heat sink 120 still remains in the internal space of the housing 102, which results in the increase of temperature in the internal space of the housing 102.

Therefore, as shown in FIGS. 1b and 1c, a new cooling method is proposed to provide a fan 130 to exhaust the remaining heat or another cooling method is proposed to provide the heat sink 120 and a heat pipe 140 to promote the effect of the conduction of the heat. Referring to FIG. 1c, the heat generated at the CPU 110 is conducted quickly through the heat sink 120 and the heat pipe 140, then is exhausted outwardly by the force of the fan 130.

Figure 3:
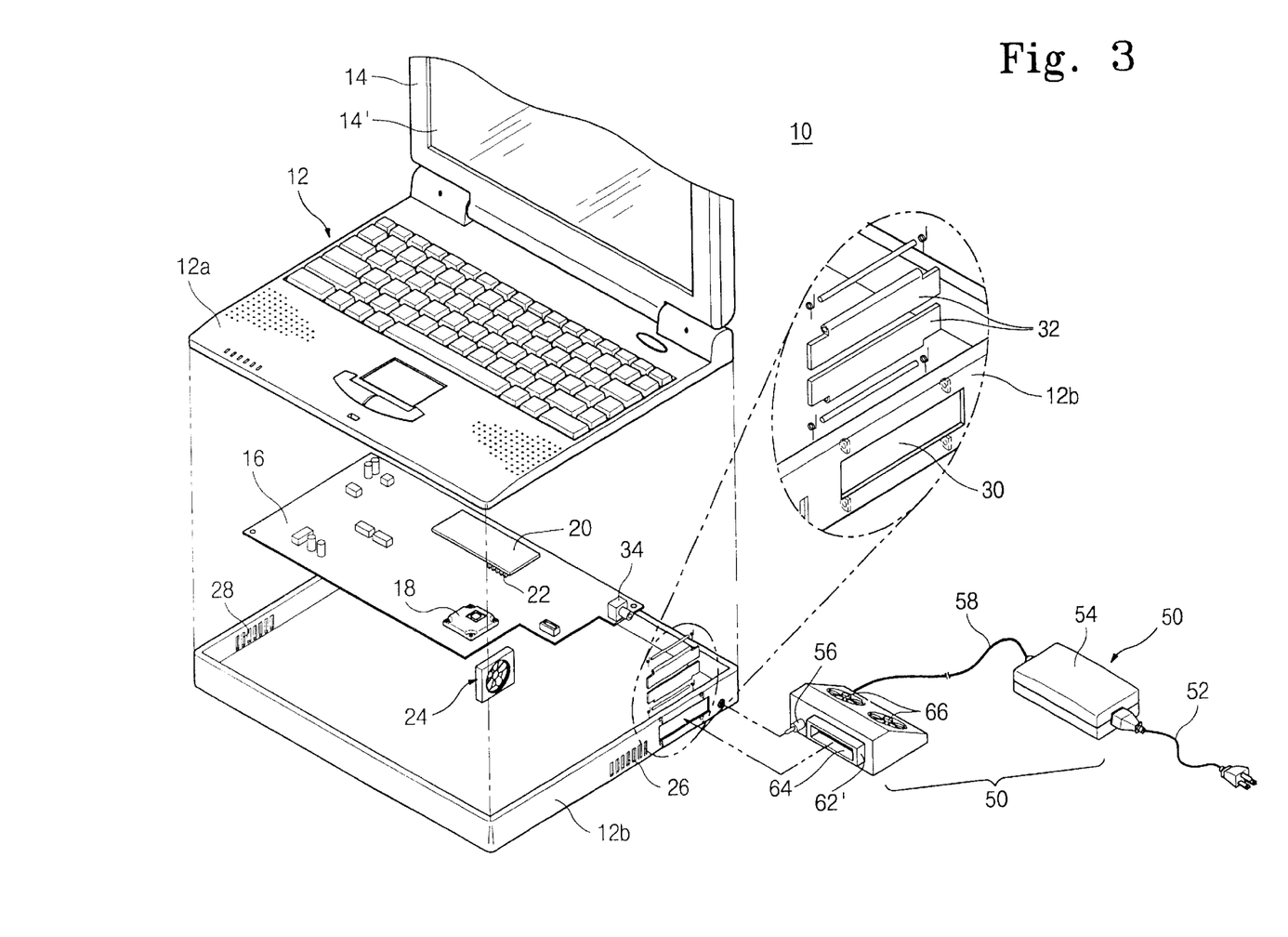
FIG. 3 is an exploded perspective view for illustrating the portable computer according the first embodiment of the present invention.

A portable computer according to the present invention is disclosed in FIG. 2. The portable computer shown in FIG. 2 is a typical notebook computer, but in any other kinds of portable computers such as wallet personal computer, personal digital assistant, hand-held personal computer and mobile computer, an adapter unit having an detachable cooling fan according to the present invention can be also applied. And FIG. 3 is an exploded perspective view for illustrating the portable computer according the present invention.

Referring to FIGS. 2–5b, the portable computer 10 according to the present invention includes a main housing 12, a display panel 14, a main board or a printed circuit board 16 and an adapter unit 50. The main housing 12 includes an upper housing 12a and a lower housing 12b, which are often called a top housing 12a and a bottom housing 12b. A regular internal space is formed by the coupling of the upper housing 12a and the lower housing 12b. In the regular internal space, the main board 16 and other electronic elements are disposed. The other electronic elements include power supply unit such as battery, storage unit such as hard disk and floppy disk and pointing device. The display panel 14 incorporating a display screen such as LCD is pivotally attached to the rear edge of the main housing 12. At the rear edge of the main housing 12, a hinge unit is formed. The hinge unit enables the display panel 14 to be moved pivotally.

The CPU 18 is mounted on the main board 16. The heat sink 20 is loaded on the CPU 18 to radiate most of heat generated by the CPU 18 to the internal space of the main housing 12. A plurality of radiating fin 22 can be formed on the heat sink 20 to increase the radiation efficiency shown in FIGS. 5a and 5b.

An auxiliary fan 24 is provided on the lower housing 12b, which draws the air heated by the circuit components in the main housing 12 to the outside of the main housing 12. As shown in the FIG. 3, a first air vent 26 is formed on the a side surface of the lower housing 12b and it is preferable that the location of the auxiliary fan 24 is adjacent to the first air vent 26.

Figure 5A:
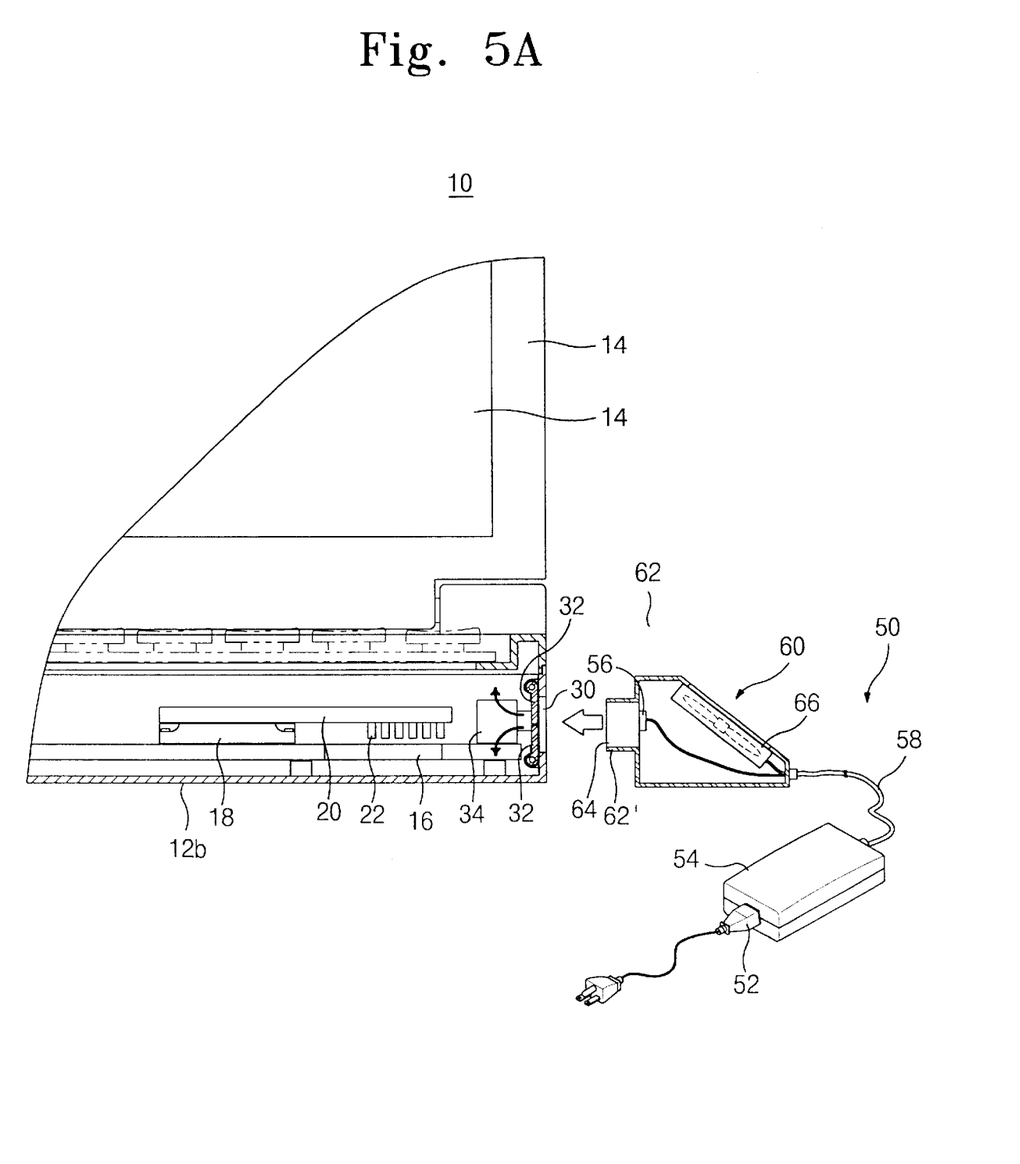
FIGS. 5a and 5b are partially cross-sectional views for illustrating a combining process of a housing of the portable computer and the adapter unit according to the first embodiment of the present invention.
Figure 5B:
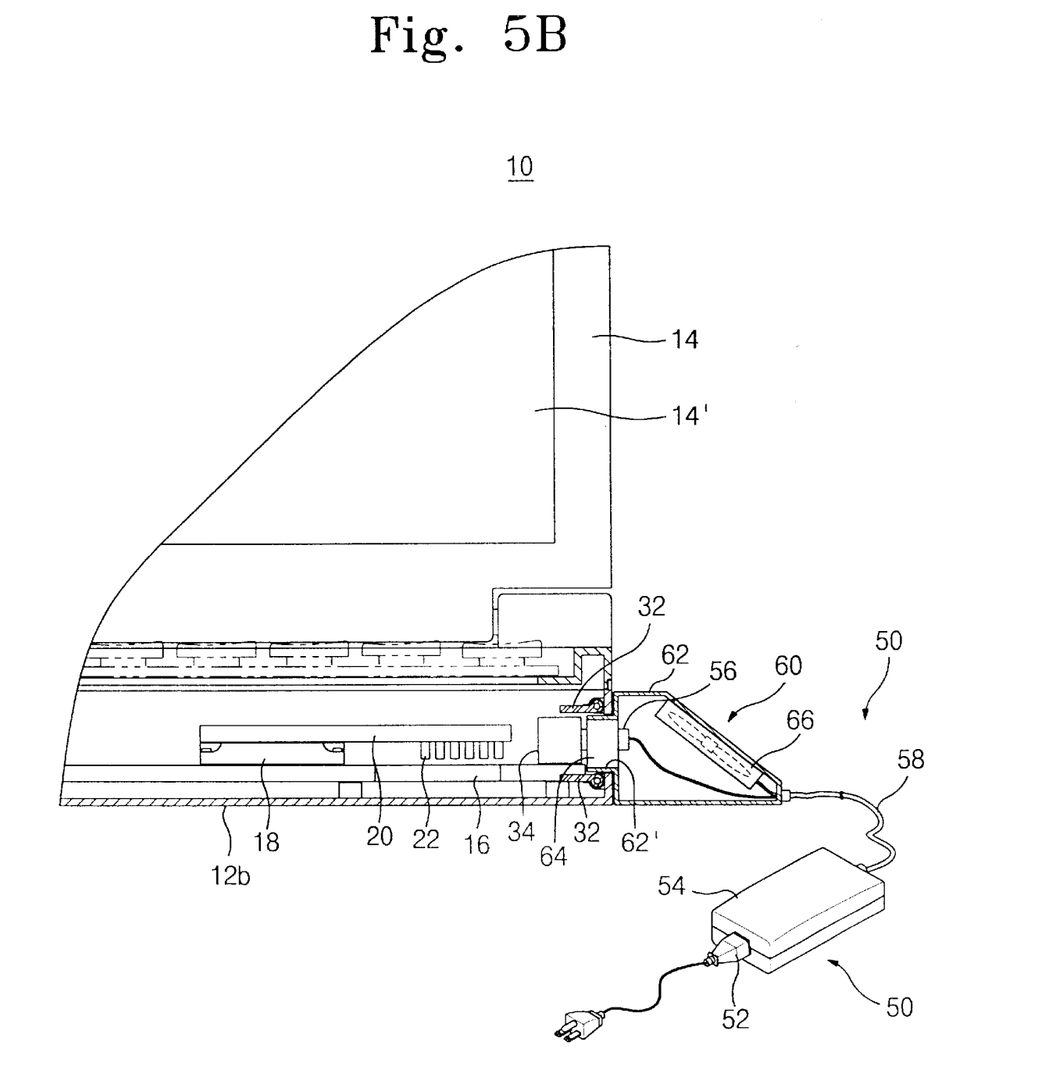

An opening 30 is formed on the side surface of the lower housing 12b and the opening 30 is formed with the type of grille, and preferably at least one second air vent 28 is formed on a side surface opposite to the side surface having the first air vent 26. A pair of opening door 32 is provided at the opening portion of the side surface. Referring to FIGS. 5a and 5b, the opening door 32 is designed to swivel, that is, when the adapter unit 50 is separated from the main body 12, the opening 30 is closed by the opening door 32 whereas the opening 30 is opened by the opening door 32 swivelled by the insertion of the adapter unit 50.

Figure 8:
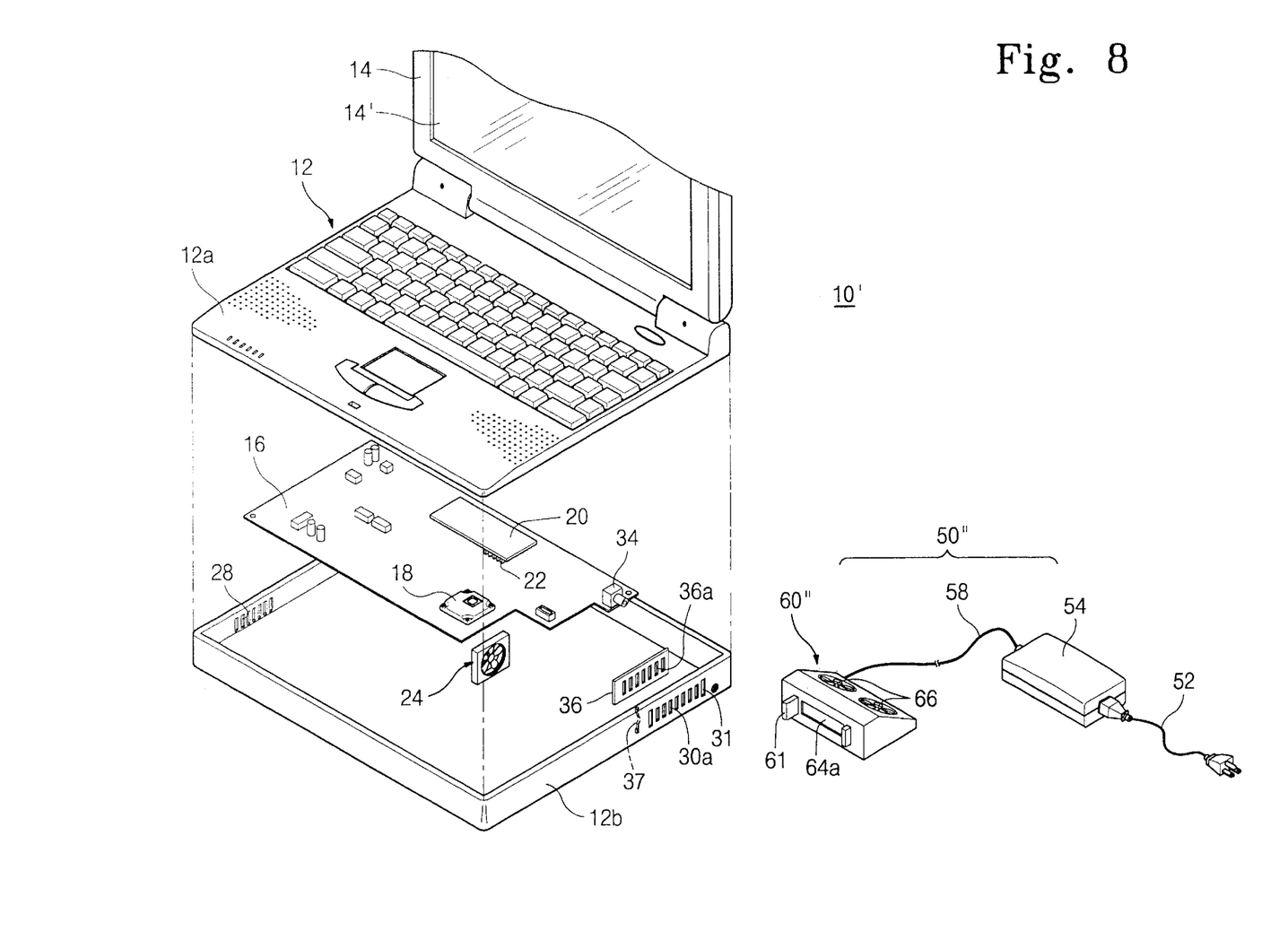
FIG. 8 is an exploded perspective view for illustrating the portable computer having a slidable opening door according to the third embodiment of the present invention.
Figure 9A:
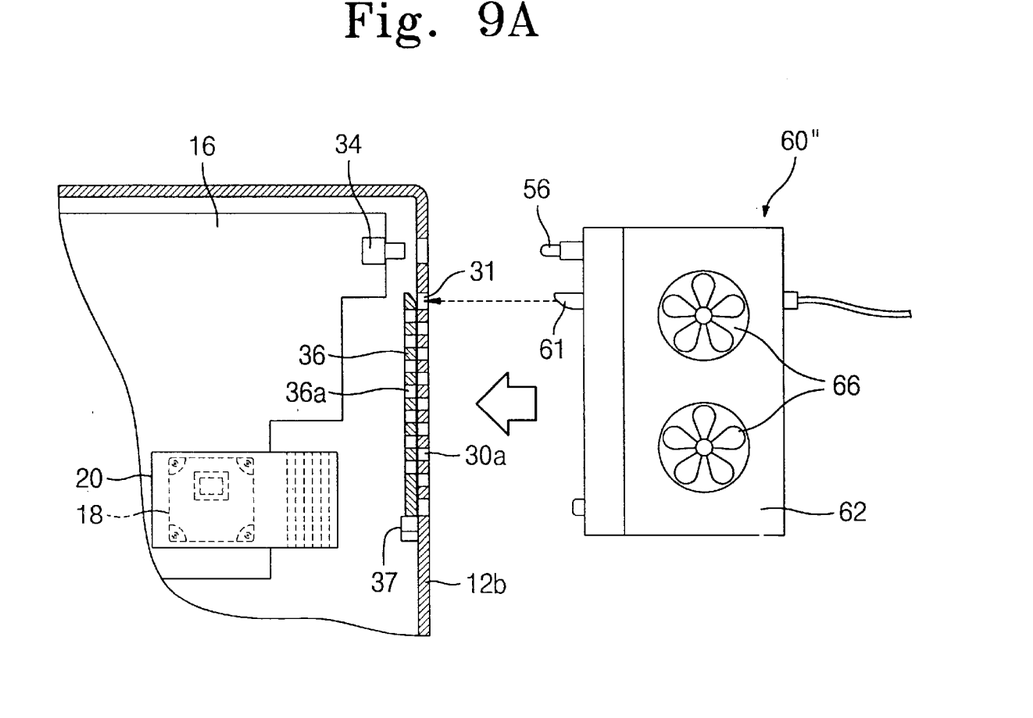
FIGS. 9a and 9b are diagrams for illustrating a combining process of the detachable cooling fan and a housing with the slidable opening door according to the third embodiment of the present invention.
Figure 9B:
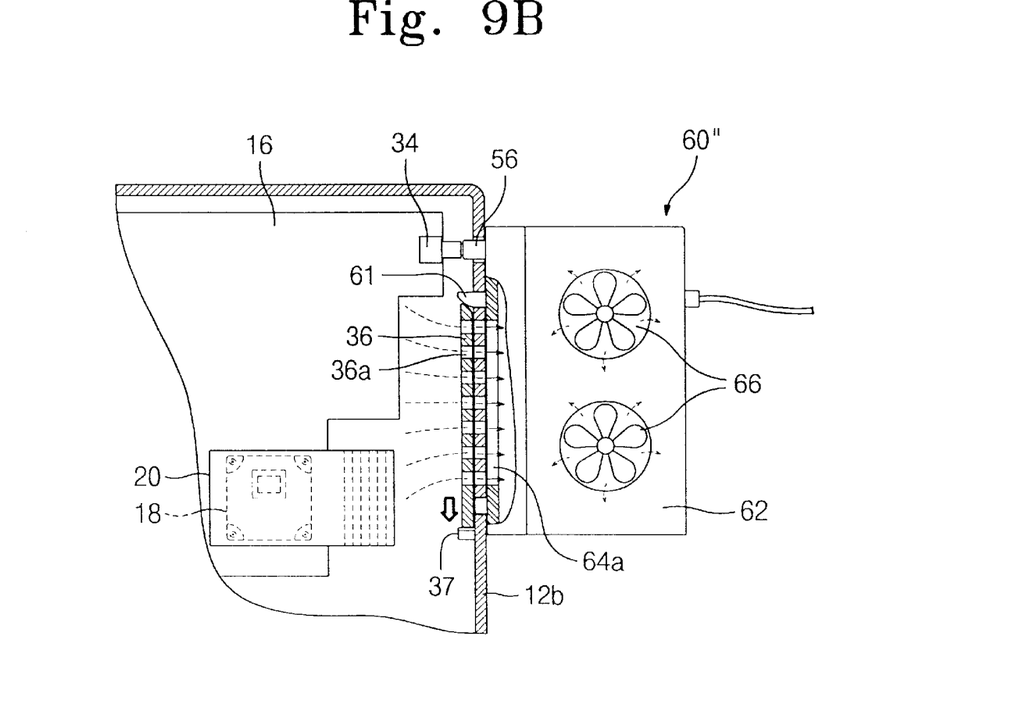

In addition to the opening door 32, a slidable opening door 36 is disclosed in the FIG. 8 or 9b. The slidable opening door 36 is provided on a side surface of the lower housing 12b, which is designed to enable to be freely moved horizontally. The slidable opening door 36 has a first opening 36a formed with the grille type and the lower housing 12b has a second opening 30a formed with the grille type. Furthermore, an entrance 64a is formed at the ventilation member 60" of the adapter unit 50". The slidable opening door 36 is disposed at the interior of the lower housing 12b and the first opening 36a and the second opening 30a are located to cross each other in ordinary state by the elastic force of a plate spring 37 shown in FIG. 9a. Referring to FIGS. 9a and 9b, when the adapter unit 50" is coupled to the lower housing 12b the pusher portion 61 of the ventilation member 60", passing a hole 31, pushes a end portion of the slidable opening door 36 to the direction of the location of plate spring 37. Then, the first opening 36a is aligned with the second opening 30, allowing air to pass into or out of main housing 12 as shown in FIG. 9b. On the other hand, when the adapter unit 50" is separated from the lower housing 12b, the first opening 36a and the second opening 30a is returned to the ordinary state which means the openings is located to cross each other so that no air may enter or exit main housing 12 through opening door 36.

As shown in FIGS. 2 and 3, a DC-IN connector 34 is mounted on the main board 16. The DC-IN connector 34 is extended to the side surface of the lower housing 12b to be connected with the adapter unit 50.

The portable computer 10 is supplied with a power voltage from the adapter unit 50 and the power voltage supplied from the adapter unit 50 is transmitted to many electronic elements such as the main board 16 and other electronic elements, for example the CPU 18, attached to the main board 16. There are two functions for adapter unit 50:1) converting the AC voltage into the DC voltage, then supplying the transformed DC voltage to the portable computer, and 2) drawing air within the main housing and discharging the air to the outside of the main housing through the opening.

Figure 4:
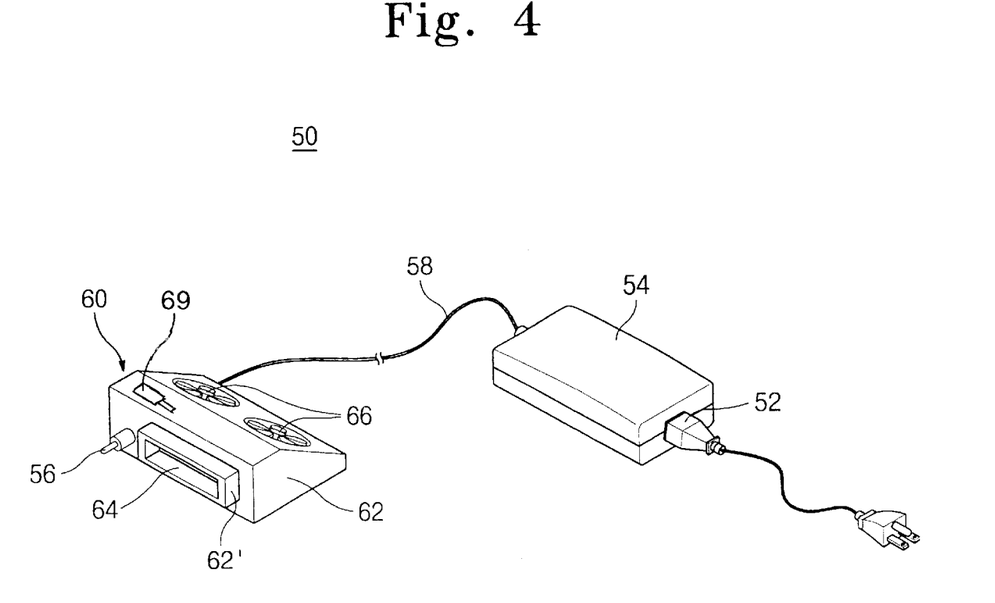
FIG. 4 is a perspective view for illustrating an adapter unit with a detachable cooling fan according to the first embodiment of the present invention.

Referring to FIG. 4, the adapter unit 50 is further explained. The adapter unit 50 includes an input terminal 52, a voltage-transformation member 54, a ventilation member 60 and an output terminal 56. The input terminal 52 receives the AC voltage from the detachable power device (not shown), and the voltage-transformation member 54 has a well-known electronic and electrical circuit to convert the AC voltage into the DC voltage. The output terminal 56 is coupled to the DC-IN connector 34 to supply the DC voltage from the voltage-transformation member 54 with the portable computer, and the output terminal 56 and the ventilation member 60 is integrated. The ventilation member 60 is connected with the voltage-transformation member 54 through a cable 58, and coupled to the side surface of the housing 12 forming the opening 30 to induce air-circulation within the main housing 12. The ventilation member 60 has a housing 62, an entrance or opening 64 and at least one fan 66. The housing 62 has a surface and an internal space. On the surface of the housing 62, the output terminal 56 is formed to be connected with the voltage-transformation member 54 through the cable 58. Also on the surface of housing 62 is a switch 69 capable of operating at least one fan 66. The entrance 64 is formed at an extending portion 62' of the surface of the housing 62. The extending portion 62' is preferably formed to be inserted into the opening 30 of the main housing.

Figure 6:
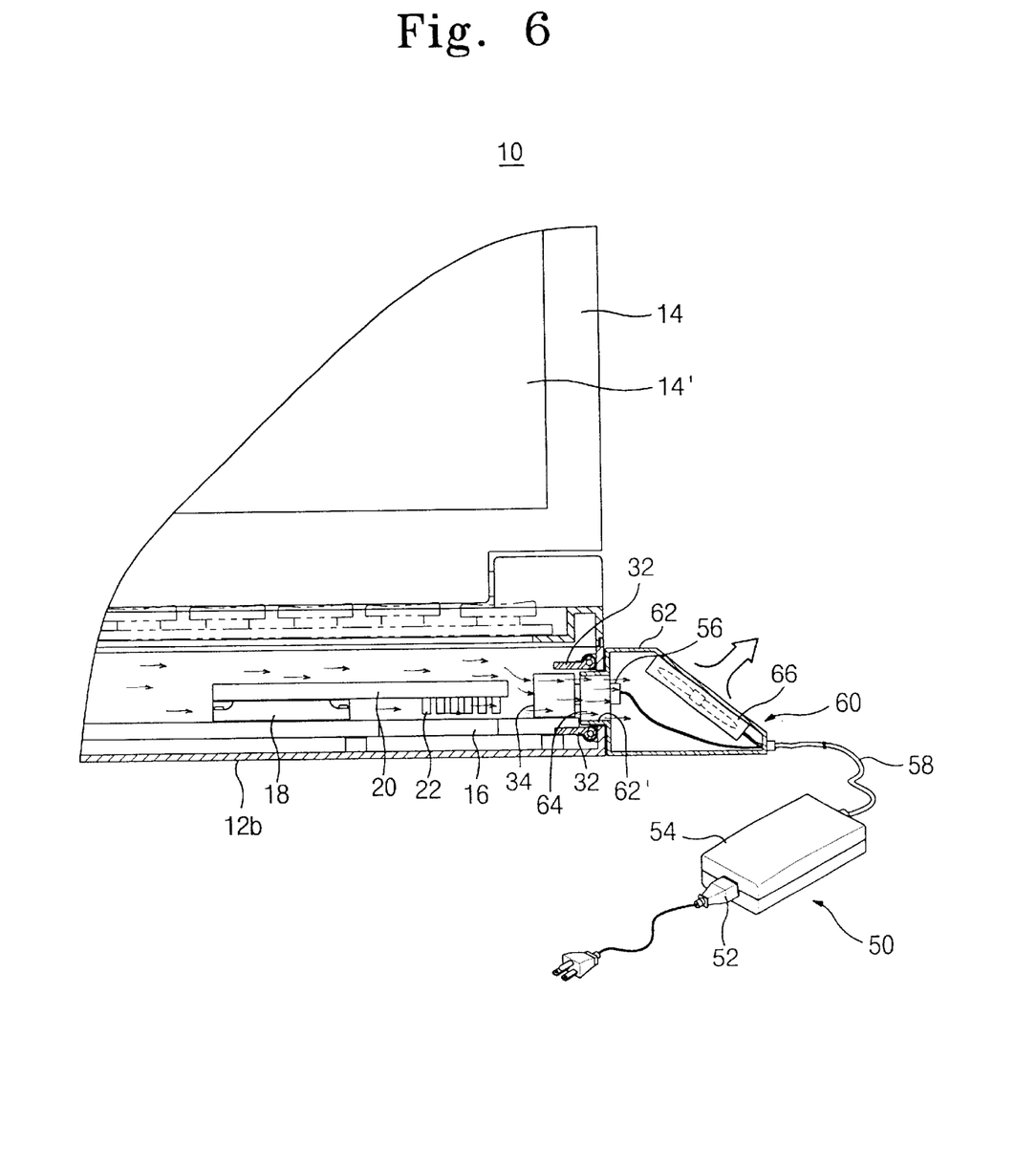
FIG. 6 is a partially cross-sectional view for illustrating air flow in the housing of a portable computer according to the first embodiment of the present invention.

When the output terminal 56 of the adapter unit is inserted into the DC-IN connector 34, the extending portion 62' of the ventilation member 60 is inserted into the opening 30, then the entrance 64 is connected with the interior of the main housing 12. In this state, the opening door 32 is pushed by the extending portion 62', then swivelled back (referring to FIG. 5b). The fan 66 is provided for the interior of the housing 62 to draw air within the main housing 12 and discharge air to the outside of the housing 62 of the adapter unit 50. The fan 66 may be operated by the using the DC voltage from the voltage-transformation member 54. The adapter unit 50 may be also provided with a switch for an operation of the fan 66. The operation of the fan 66 induces air-circulation within main housing 12 causing heat produced from the CPU 18 and radiated to the heat sink 20 to be discharged to the outside of the main housing 12 from the air flow as shown in FIG. 6. In the present invention, the fan 60 is located at the outside of the main housing 12, then a size and a shape of the fan 60 are free to produce the powerful effect in dissipating the heat within the main housing 12.

Figure 7:
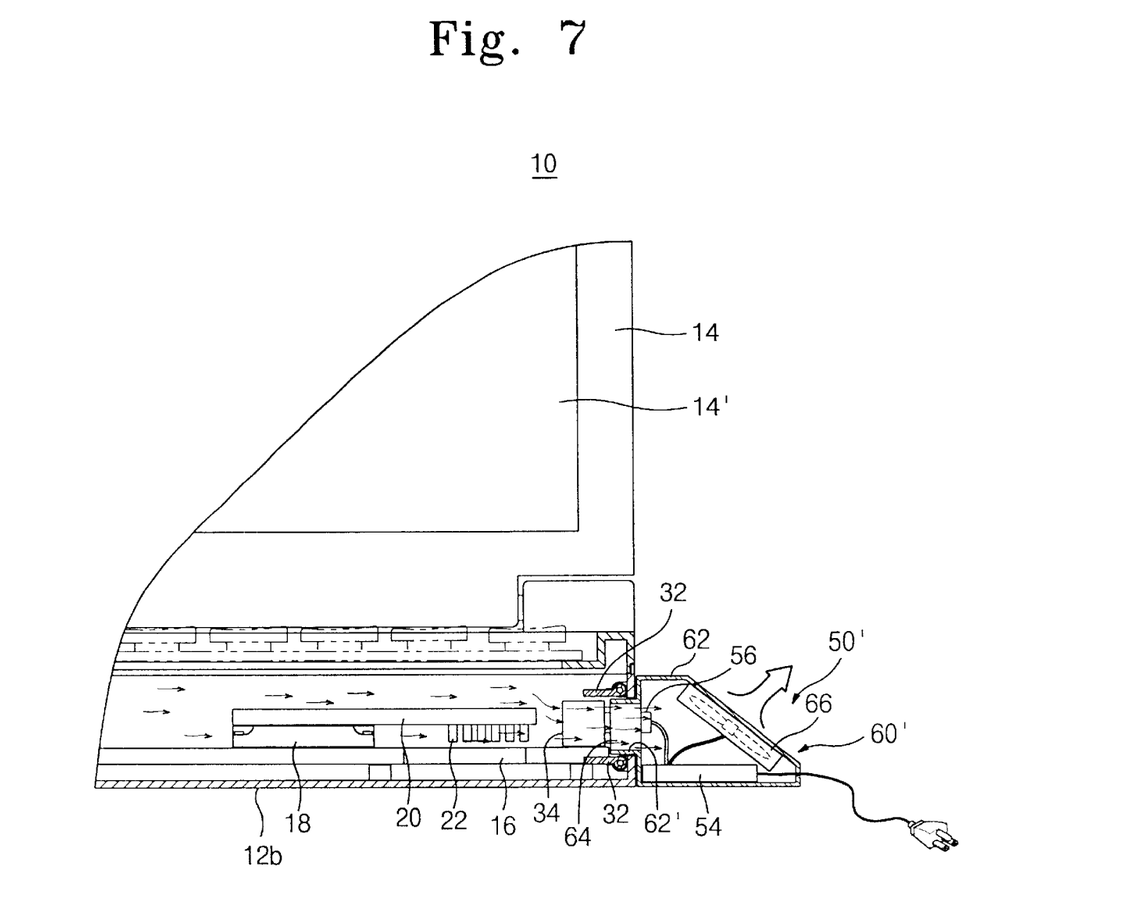
FIG. 7 is a partially cross-sectional view for illustrating the adapter unit according to a second embodiment of the present invention.

FIG. 7 is another embodiment of the adapter unit, which illustrates that the voltage-transformation member 54 is disposed in the housing 62 of the ventilation member 60'. In this structure, the advantage is that the size of the adapter unit 50' is decreased and the heat from the voltage-transformation member 54 is also discharged to the outside of the housing 62 of the ventilation member 60'. As mentioned above, the adapter unit performed the dual function of converting the voltage and cooling the main housing 12 of portable computer 10.

The process for removing heat is discussed in more detail. Referring to FIGS. 5a–6, the output terminal 56 of the adapter unit 50 is inserted into the DC-IN connector 34 and simultaneously the extending portion 62' is inserted into the opening 30. As the power is supplied to the portable computer through the output terminal 56, the CPU 18 is operated and the heat is generated from the CPU 18. The generated heat is conducted to the heat sink 20. The heat transmitted to the heat sink 20 is radiated to the space within the main housing 12, which causes an increase in temperature of the space within the main housing 12.

Arrows shown in FIG. 6 indicates the air-flow of the space within the main housing 12 when fan 66 is operated. Air is introduced through the second air vent 28 (referring to FIG. 3), passed over the CPU 18 and the heat sink 20, and then mixed with the heated air to be delivered to the entrance 64 of the adapter unit 50. The heated air passes through and is discharged from housing 62. Thus, the heat radiated by the heat sink 20 is directly discharged to the outside of portable computer 10 and adapter unit 50. It is also possible that even in the portable computer having no fan, the same cooling effect is achieved by using the detachable cooling fan.

Therefore, the fan may be provided within the portable computer, or may be not provided within the portable computer.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A detachable unit for an electronic device, comprising:
   a voltage-transformation member for converting the AC voltage into the DC voltage, said voltage transformation member having an input terminal for receiving AC voltage and an output terminal for supplying DC voltage to said electronic device; and
   a ventilation member attached to said electronic device, wherein the ventilation member induces air-circulation of an inside of said electronic device, and wherein the output terminal and the ventilation member are integrated together to be electrically and physically connected with said electronic device, said detachable unit being portable.

2. The unit of claim 1, wherein said ventilation member further comprises:
   a housing, said housing being perforated by an opening; and
   a fan provided for said housing, wherein said fan discharges air from said inside of said electronic device to an outside of said electronic device through said opening when the output terminal is electrically connected to said electronic device.

3. The unit of claim 2, wherein said ventilation member further comprises a switch capable of operating the fan.

4. The unit of claim 2, said opening of said housing of said ventilation member being surrounded by a flange or protrusion.

5. The unit of claim 2, wherein said housing encompasses said voltage-transformation member.

6. A portable electronic device, comprising:
   a main housing incorporating a plurality of electronic units, the main housing having a first opening formed on a surface of the main housing and a connector disposed adjacent to the first opening, said connector being electrically connected to said plurality of electronic units, said main housing having a second opening opposite said first opening; and
   an adapter unit comprising an AC to DC converter supplying DC power to said plurality of electronic units through the connector and a ventilation member drawing air from an interior of the main housing through the first opening.

7. The portable electronic device of claim 6, said ventilation member of the adapter unit connected to the AC to DC converter via a cable, the ventilation member being attached to said main housing at said first opening to induce air-circulation inside the main housing, said adapter unit comprising an output terminal integrated with the ventilation member and coupled to the connector to supply the DC voltage from the AC to DC converter to the connector and to the plurality of electronic units.

8. The portable electronic device of claim 7, said ventilation member further comprises:
   a ventilation housing, said ventilation housing being perforated by an opening; and
   a fan provided in said ventilation housing, said fan discharging air from said inside of said main housing to an outside of said main housing through said first opening when the output terminal is electrically connected to said connector.

9. The electronic device of claim 8, wherein said electronic device is a portable computer.

10. The portable electronic device of claim 7 the main housing further comprises an opening door provided at the first opening, the first opening being automatically closed by the opening door when the ventilation member is separated from the main housing, the first opening being automatically open by the movement of the opening door when the ventilation member is attached to the main housing at said first opening.

11. The portable electronic device of claim 6, the adapter unit comprises:
    an input terminal for receiving AC voltage;
    a main body comprising the AC to DC converter;
    an output terminal provided at the surface of the main body and coupled to the connector to supply the DC voltage from the voltage-transformation member to said electronic units; and
    a fan provided for the main body, wherein the fan draws and discharges air from the inside of the main housing to the outside of the main body through the ventilation opening on said main body when the output terminal is connected with the connector.

12. The electronic device of claim 6, said first opening in said main housing comprises a slidable piece placed just inside said first opening of said main housing covering, said slidable piece comprising a grating of parallel bars that coincide with a fixed grating of parallel bars covering said first opening of said main housing when said adapter unit is attached to said first opening of said main housing allowing air to freely flow through said first opening in said main housing, said slidable piece shifts so that said grating of parallel bars of said piece covers spaces between said fixed grating of parallel bars of said first opening of said main housing when said adapter unit is not attached to said first opening of said main housing, thus preventing air from freely flow through said first opening when said adapter unit is not attached to said first opening of said main housing.

13. A portable computer, comprising:
    a cover having a display displaying variable visual images;
    a main body hingedly attached to said cover, said main body having a top portion, a bottom portion, and a printed circuit board formed therebetween, said top portion having a keyboard being disposed thereon, said printed circuit board having a plurality of heat dissipating integrated circuit chips assembled thereon, a sidewall of said main body attached to said bottom portion, said sidewall having a pair of openings opposite from each other allowing for cross-ventilation of an interior of said main body containing said plurality of integrated circuit chips; and
    an adapter unit attachable to one of said pair of openings of said sidewall of said bottom portion of said main body, said adapter unit having a fan for providing forced cross-ventilation of said interior of said main body, said adapter unit having an AC to DC voltage converter providing DC voltage to power said portable computer.

14. The portable computer of claim 13, said adapter unit comprising:

a first housing encompassing said fan, said first housing being perforated by an opening that mates with one of said pair of openings of said sidewall of said bottom portion of said main body to provide an air-tight connection between said first housing of said adapter unit and said main body, allowing said fan to forcibly draw air from said interior of said main body to outside said adapter unit efficiently; and a second housing encompassing said AC to DC voltage converter.

15. The portable computer of claim 14, wherein said portable computer contains a DC-IN power connector on said sidewall of said bottom portion of said main body near one of said pair of openings, said DC-IN power connector physically mates and electrically connects to an output terminal projecting from said first housing of said adapter unit when said first housing of said adapter unit is physically connected to said one of said pair of openings of said main body.

16. The portable computer of claim 15, wherein one of said pair of openings of said sidewall of said bottom portion of said main body comprises a pair of opening doors, each attached to spring operated hinges, springs on said spring operated hinges causing said pair of opening doors to close when said adapter unit is not connected to said one of said pair of openings, said opening of said first housing of said adapter unit having a flange or protrusion surrounding said opening of said first housing of said adapter unit, said flange or protrusion operating against biases of said springs to cause said pair of opening doors to rotate open when said first housing of said adapter unit is physically connected to said one of said pair of openings of said sidewall of said bottom portion of said main body.

17. The portable computer of claim 16, wherein said first housing of said adapter unit encompasses said second housing of said adapter unit.

18. The portable computer of claim 15, wherein one of said pair of openings of said sidewall of said bottom portion of said main body comprises a grating of parallel bars, said main body also having a slidable piece placed just inside said one of said pair of openings of said main body, said slidable piece also containing a grating of parallel bars that coincide with said grating of parallel bars of said one of said pair of openings of said main body when said adapter unit is attached to said one of said pair of openings of said main body, allowing air to freely flow from said interior of said main body through said one of said pair of openings of said main body and through said first housing of said adapter unit to outside said portable computer, said slidable piece shifts so that said grating of parallel bars of said slidable piece covers spaces between said parallel bars of said first opening of said main housing when said adapter unit is not attached to said one of said pair of openings of said main body, thus preventing air to freely flow through said one of said pair of openings of said main body when said adapter unit is not attached to said one of said pair of openings of said main body.

19. The portable computer of claim 18, wherein said first housing of said adapter unit encompasses said second housing of said adapter unit.

* * * * *